Patented Dec. 12, 1944

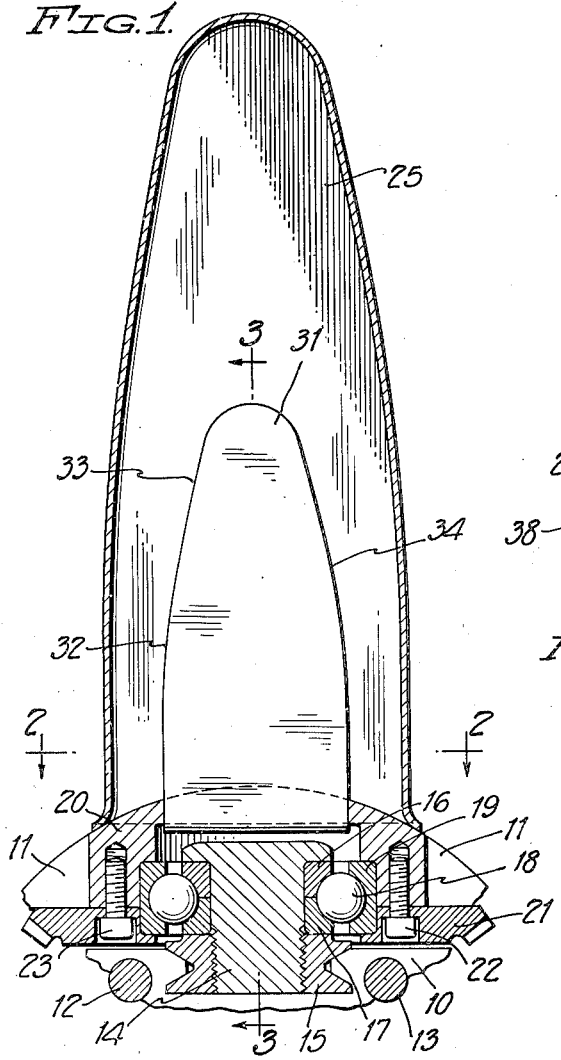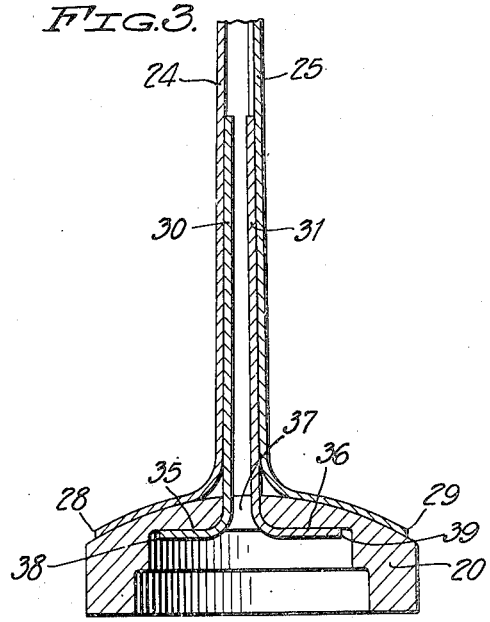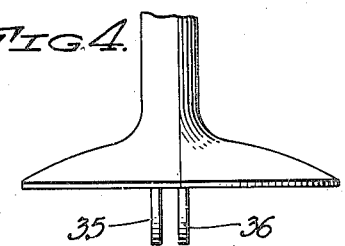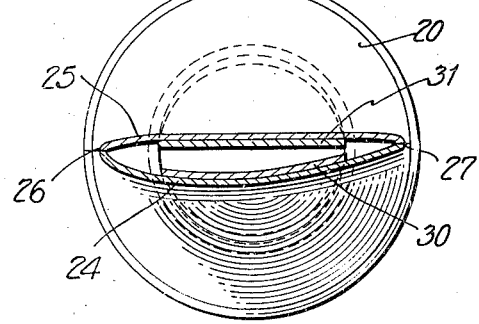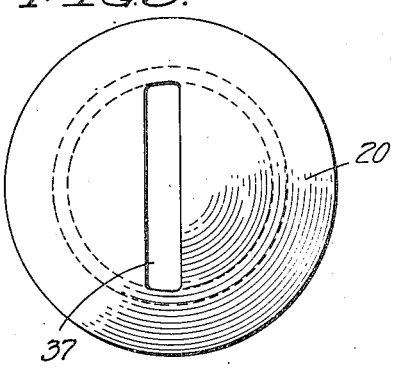
Dec. 12, 1944. R. H. HASLER 2,364,635
PROPELLER BLADE
Filed Aug. 5, 1943
INVENTOR.
ROBERT H. HASLER
BY
ATTORNEYS.

2,364,635

UNITED STATES PATENT OFFICE 2,364,635

PROPELLER BLADE

Robert H. Hasler, Old Westbury, N. Y.

Application August 5, 1943, Serial No. 497,435

2 Claims. (Cl. 170—159)

This invention relates to the construction of propeller blades. While the construction may be embodied in different types of propeller blades, it is particularly applicable to those of the controllable pitch type as shown for example in my pending patent application entitled Aircraft propellers, filed July 29, 1943, Serial No. 496,550.

One object of the invention is to provide a propeller blade of light weight and low cost. Another object is a form of construction that will resist the heavy centrifugal force incident to the use of aircraft propeller blades.

Other advantages will be seen from the following description and drawing.

Figure 1 is a longitudinal section of one of my propeller blades with portions of the propeller housing and blade supporting parts.

Figure 2 is a transverse section on the line 2—2 of Figure 1.

Figure 3 is a longitudinal section of a portion of a blade and its base taken at right angles to the section shown in Figure 1.

Figure 4 is a detail view of part of a blade in process of manufacture.

Figure 5 is a view of a blade base before being assembled with the other blade parts.

In Figure 1 I have indicated at 10 and 11 parts of a front propeller housing, which is to be drawn against a corresponding rear housing (not shown herein), by means of a a series of clamping screws of which two are indicated in cross section at 12 and 13. These parts correspond with the construction illustrated in my aforesaid application, Serial No. 496,550. Fitted into this two-part housing are the stud 14 and the grooved nut 15, which latter is supported on semi-annular tongues forming parts of the housing. The stud 14 supports the inner races 16 and 17 of the ball bearing 18. The outer race 19 of this ball bearing carries and supports the interiorly chambered blade base 20. The annular mounting ring 21 is attached to the blade base 20 by screws, two of which are shown at 22 and 23. The mounting ring 21 clamps the outer ball bearing race 19 to the base 20 and may be constructed as a gear wheel to rotate the blade base 20 on the ball bearing 18, for producing the change of pitch angle of the propeller blades.

Parts of the blades other than the base are formed of sheet metal stampings welded to one another and also welded to the blade base. I prefer to make all these parts of steel to facilitate the welding operations.

The radial blade or arm portions of two of these sheet metal pieces are shown at 24 and 25. They are of complementary contour to fit together as a unit and form a rigid hollow blade when welded together along their edges as shown at 26 and 27. Adjacent to the base each of these parts is formed with a skirt of hemispherical contour to conform with the outer surface of the blade base 20. They are welded to the base around their outer edges as shown at 28 and 29 and may also be spot welded to the base at interior points, if desired.

Welded to the inside of the above-described parts 24 and 25 are reenforcing and tension plates 30 and 31, also of sheet metal. Plate 31 is welded along its edges 32, 33 and 34 to the inside surface of blade arm 25 while plate 30 is welded in a similar manner to the inside surface of blade arm 24.

These plates 30 and 31 have extensions or feet 35 and 36 respectively that project through a slot 37 in base 20 and are bent outwardly and welded to the inner surface of the base 20 at their terminal edges 38 and 39.

In the process of manufacture, each reenforcing and tension plate 30 or 31 is first welded to the inside of its respective blade part 24 or 25. The parts 24 and 25 are then brought together and welded around their edges with the feet 35 and 36 of the plates 30 and 31 extending straight as shown in Figure 4. All four of the sheet metal parts having been thus assembled are then applied as a unit to the base 20 and the skirt portions of the parts 24 and 25 are welded to the base as already mentioned. The feet 35 and 36 are then folded into place beneath the transverse upper wall of the base member as shown in Figure 3 and while in this position are welded to the inner surface thereof.

My arrangement of the sheet metal parts affords a cellular form of structure of decided strength and lightness.

Folding the reenforcing plates over against the inside surface of the blade base enables the full tensile strength of the plates (unaffected by the welding operation), to resist the pull of centrifugal force. The outer shell of the blade may be streamlined over its entire exposed area and is firmly and rigidly seated at its full width on the blade base.

I claim:

1. A propeller blade construction comprising an interiorly chambered base member, ball bearings disposed in the chamber of said base member on annular inner and outer races, the outer race being seated in said base member, a mounting stud on which said inner race is seated, a hollow propeller blade secured on the outer surface of said chambered base member, and a tension member secured to the interior of said blade and extending through said base member and secured thereto.

2. A propeller blade construction comprising an interiorly chambered base member, ball bearings disposed in the chamber of said base member on annular inner and outer races, the outer race being seated in the said base member, a mounting stud on which said inner race is seated, means for securing said inner and outer races in their respective positions, a hollow propeller blade secured on the outer surface of said chambered base member, and a tension member secured to the interior of said blade and extending through said base member and secured beneath the transverse upper wall thereof.

ROBERT H. HASLER.